United States Patent
Kim

(10) Patent No.: US 8,868,271 B2
(45) Date of Patent: Oct. 21, 2014

(54) SYSTEM AND METHOD FOR MOTOR TORQUE CONTROL FOR ELECTRIC VEHICLE WITH TRANSMISSION

(71) Applicant: Hyundai Motor Company, Seoul (KR)

(72) Inventor: Sang Joon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/713,943

(22) Filed: Dec. 13, 2012

(65) Prior Publication Data

US 2014/0121874 A1    May 1, 2014

(30) Foreign Application Priority Data

Oct. 26, 2012   (KR) .................. 10-2012-0120001

(51) Int. Cl.
- *B60W 30/19* (2012.01)
- *B60W 10/11* (2012.01)
- *B60W 10/08* (2006.01)
- *B60L 9/00* (2006.01)
- *F16H 3/38* (2006.01)

(52) U.S. Cl.
CPC .............. *B60W 30/19* (2013.01); *B60W 10/08* (2013.01); *B60L 9/00* (2013.01); *F16H 3/38* (2013.01); *B60W 2600/00* (2013.01); *B60W 10/11* (2013.01)
USPC ...................... 701/22; 180/65.275; 180/65.28; 180/65.285; 477/15; 477/16; 477/17; 477/18; 477/19; 477/20; 477/107; 477/108; 477/109; 477/110; 477/115; 477/120; 701/51; 701/66

(58) Field of Classification Search
CPC ........ B60K 6/42; B60W 10/02; B60W 10/04; B60W 10/10; B60L 9/00; F16H 3/38
USPC .................. 701/51–66, 22; 477/8, 90, 15–20, 477/107–110, 115, 120; 180/65.275, 65.28, 180/65.285
See application file for complete search history.

(56) References Cited

U.S. PATENT DOCUMENTS

| | | | | |
|---|---|---|---|---|
| 4,922,424 | A * | 5/1990 | Hiramatsu | 701/53 |
| 4,943,920 | A * | 7/1990 | Hiramatsu et al. | 701/51 |
| 4,947,330 | A * | 8/1990 | Hiramatsu | 701/55 |
| 6,656,082 | B1 * | 12/2003 | Yamada et al. | 477/5 |
| 6,695,747 | B2 * | 2/2004 | Zimmermann et al. | 477/123 |
| RE39,183 | E * | 7/2006 | Nada | 701/82 |
| 7,094,176 | B2 * | 8/2006 | Budal et al. | 477/5 |
| 7,156,217 | B2 * | 1/2007 | Raber | 192/84.6 |
| 7,357,204 | B2 * | 4/2008 | Hisada et al. | 180/65.285 |
| 7,496,435 | B2 * | 2/2009 | Iwatsuki et al. | 701/22 |
| 7,565,938 | B2 * | 7/2009 | Hisada et al. | 180/65.1 |
| 7,607,499 | B2 * | 10/2009 | Egami | 180/65.265 |
| 7,761,211 | B2 * | 7/2010 | Hofmann | 701/51 |
| 7,762,365 | B2 * | 7/2010 | Iwanaka et al. | 180/65.22 |
| 8,131,467 | B2 * | 3/2012 | Yoshioka et al. | 701/437 |

(Continued)

*Primary Examiner* — Calvin Cheung
*Assistant Examiner* — Allen E Quillen
(74) *Attorney, Agent, or Firm* — Edwards Wildman Palmer LLP; Peter F. Corless

(57) ABSTRACT

Disclosed herein is a motor control system and method for a vehicle with a transmission comprising for improving the quality of shifting, by improving precision in shifting control with precise and active motor torque control by calculating a maximum and a minimum motor torque in response to determining a power-on up-shift for increasing a shifting gear and a power-off down-shift for decreasing the shifting gear in shifting of the vehicle.

12 Claims, 4 Drawing Sheets

(56) References Cited

U.S. PATENT DOCUMENTS

| | | | |
|---|---|---|---|
| 8,177,685 B2 * | 5/2012 | Leibbrandt et al. | 477/109 |
| 8,206,263 B2 * | 6/2012 | Tsuchikawa | 477/71 |
| 8,298,118 B2 * | 10/2012 | Kim et al. | 477/15 |
| 8,457,823 B2 * | 6/2013 | Falkenstein | 701/22 |
| 8,457,873 B2 * | 6/2013 | Hyde et al. | 701/123 |
| 8,571,767 B2 * | 10/2013 | Porta et al. | 701/51 |
| 8,583,304 B2 * | 11/2013 | Uyeki | 701/22 |
| 2004/0134697 A1 * | 7/2004 | Kobayashi et al. | 180/65.2 |
| 2007/0038340 A1 * | 2/2007 | Sekiguchi et al. | 701/22 |
| 2008/0132379 A1 * | 6/2008 | Matsubara et al. | 477/3 |
| 2008/0153664 A1 * | 6/2008 | Tabata et al. | 477/37 |
| 2010/0131164 A1 * | 5/2010 | Carter et al. | 701/61 |
| 2010/0203995 A1 * | 8/2010 | Zhang et al. | 475/5 |
| 2011/0030493 A1 * | 2/2011 | Koenig et al. | 74/473.11 |
| 2011/0093147 A1 * | 4/2011 | Kaltenbach et al. | 701/22 |
| 2011/0112709 A1 * | 5/2011 | Park et al. | 701/22 |
| 2012/0035014 A1 * | 2/2012 | Moeller | 475/5 |
| 2012/0116624 A1 * | 5/2012 | Reith | 701/22 |
| 2012/0160202 A1 * | 6/2012 | Vogt et al. | 123/179.25 |
| 2012/0253568 A1 * | 10/2012 | Uyeki | 701/22 |
| 2012/0265427 A1 * | 10/2012 | Petridis et al. | 701/113 |
| 2013/0045833 A1 * | 2/2013 | Okubo et al. | 477/5 |
| 2013/0079967 A1 * | 3/2013 | Terakawa et al. | 701/22 |
| 2013/0296110 A1 * | 11/2013 | Shelton et al. | 477/5 |
| 2013/0304337 A1 * | 11/2013 | Terakawa et al. | 701/58 |

\* cited by examiner

SYSTEM AND METHOD FOR MOTOR TORQUE CONTROL FOR ELECTRIC VEHICLE WITH TRANSMISSION

CROSS-REFERENCE TO RELATED APPLICATION

This application claims under 35 U.S.C. §119(a) the benefit of Korean Patent Application No. 10-2012-0120001 filed Oct. 26, 2012 the entire contents of which are incorporated herein by reference.

BACKGROUND (a) Technical Field

The present invention relates to a system and method for motor torque control for an electric vehicle with a transmission, and more particularly, to a system and method for controlling motor torque while shifting.

(b) Background Art

For vehicles with an internal combustion engine in the related art, when controlling engine torque in shifting a gear, it is possible to control torque at the level of positive torque because negative torque cannot be generated from the engine and the responsiveness of the engine is poor, and the time for shifting is reduced by clutch control of the transmission.

Further, the amount of torque control in shifting is generally determined by the experience of engineers so precision in shifting control decreases and thus, limiting improvements in the quality of shifting.

An electric vehicle ("EV") vehicle is driven only by a motor operated by electricity, without using an internal combustion engine. The motor can generate not only positive torque but also negative torque. Thus, for an EV with a transmission, it may be possible to achieve improved shifting quality by measuring a difference in torque control in shifting applied to vehicles with an internal combustion engine of the related art.

The description provided above as a related art of the present invention is for helping understanding the background of the present invention and should not be construed as being included in the related art known by those skilled in the art.

SUMMARY

The present invention provides a motor torque control method and system for an electric vehicle with a transmission that may improve the quality of shifting, by improving precision in shifting control with motor torque control, when shifting with a motor in an electric vehicle with a transmission.

The present invention provides a motor torque control method for an electric vehicle with a transmission, which includes: determining, by a controller, a power-on up-shift to increase the shifting gear and power-off down-shift to decrease the shifting gear in shifting of the electric vehicle; determining, by the controller, a target shift time to finish shifting; determining, by the controller, a target angular acceleration of a motor corresponding to the target shift time; calculating, by the controller, a maximum motor torque of the motor to operate in shifting, using the target angular acceleration; determining, by the controller, a smaller value of the maximum target torque and the target driving torque of the motor at the beginning of shifting, as motor output torque to be output by the motor in shifting, in response to determining the power-on up-shift; calculating, by the controller, the minimum motor torque of the motor to operate in shifting, using the target angular acceleration, in response to determining the power-off down-shift; determining, by the controller, a larger value of the minimum target torque and target driving torque of a motor at the beginning of shifting, as motor output torque to be output by the motor in shifting, in response to determining the power-off down-shift.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
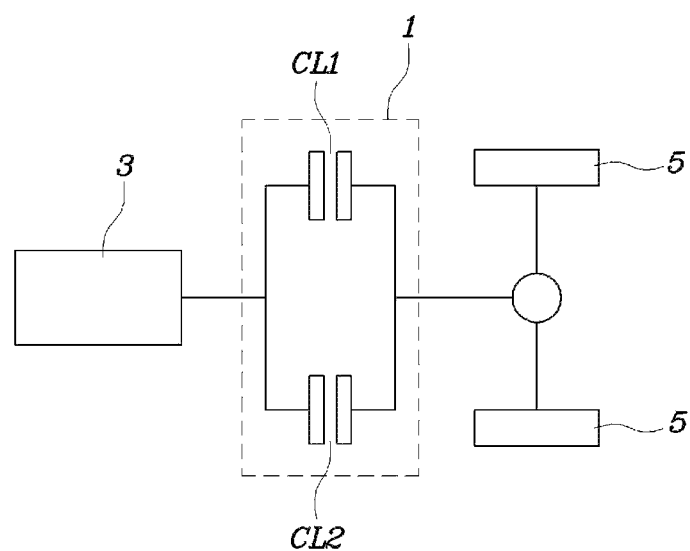
FIG. 1 is an exemplary diagram illustrating a configuration of an electric vehicle with a two-gear dual clutch transmission (DCT) to which the present invention can be applied, according to an exemplary embodiment of the present invention.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will be made in detail to various embodiments of the present invention, examples of which are illustrated in the accompanying drawings and described below.

FIG. 1 is an exemplary diagram illustrating a configuration of an electric vehicle with a two-gear DCT where the present invention may be applied, in which a DCT 1 may include a first clutch CL1 and a second clutch CL2, wherein when the first clutch CL1 is engaged, the first shifting gear is engaged, and when the second clutch CL2 is engaged, the second shifting gear is engaged, thus a driving force of a motor 3 may be transmitted to driving wheels 5.

Although it may exemplified for simplifying the present invention in FIG. 1 that the DCT 1 may implement only the first gear and the second gear by relatively engaging the first clutch CL1 and the second clutch CL2 with each other, the present invention may be applied to a transmission with one clutch.

Figure 2:
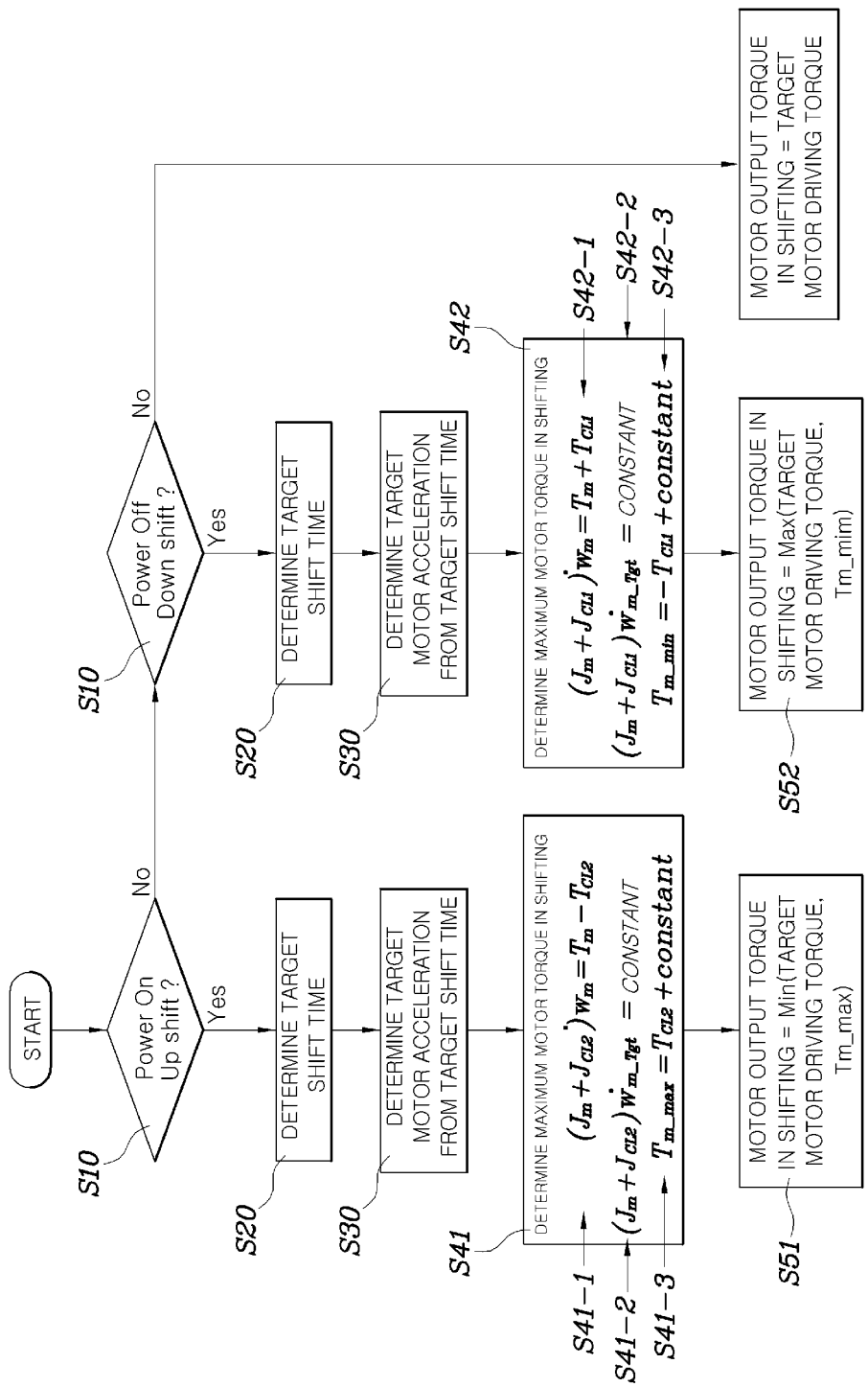
FIG. 2 is an exemplary flowchart illustrating an embodiment of a motor torque control method of an electric vehicle with a transmission according to an exemplary embodiment of the present invention.

Referring to FIG. 2, a motor torque control method for an electric vehicle with a transmission of the present invention includes: determining, by a controller, a power-on up-shift to increase the shifting gear and power-off down-shift to decrease the shifting gear in shifting of the electric vehicle (S20); determining, by the controller a target shift time to finish shifting (S30); determining, by the controller, a target angular acceleration of a motor corresponding to the target shift time (S20); in response to determining the power-on up-shift, calculating, by the controller, a maximum motor torque value of the motor to operate in shifting, using the target angular acceleration (S41); in response to determining the power-on up-shift, determining, by the controller, a smaller value of the maximum target torque value and the target driving torque of the motor at the beginning of shifting, as motor output torque to be output by the motor in shifting (S51); in response to determining the power-off down shift, calculating, by the processor, the minimum motor torque value of a motor to operate in shifting, using the target angular acceleration (S42); in response to determining the power-off down-shift, determining, by the controller, a larger value of the minimum target torque value and target driving torque of the motor at the beginning of shifting, as motor output torque to be output by the motor in shifting (S52).

In other words, the present invention discloses finding the target angular acceleration corresponding to the angular acceleration of a motor from a current time to a target shift time to complete shifting, which is determined in step S20 in response to the determined shift direction, for the speed of the motor to become the same as the speed of a clutch to be engaged, and actively controlling the motor by determining the motor output torque to be output by the motor through in response to the shift direction, thereby improving the quality of shifting including shifting feel and shifting responsiveness, with active and precise control of the motor in shifting.

The calculation of the maximum motor torque value may further include: setting a relational expression illustrating a value obtained by multiplying the inertia moment of a motor and a clutch to be engaged by the angular acceleration of the motor is the same as a value obtained by subtracting the clutch torque of the clutch to be engaged from the motor torque, in power-on up-shift (S41-1); setting the value obtained by the multiplying as a constant, with the target angular acceleration (e.g., the target angular acceleration of step 30) as the angular acceleration of the motor which is multiplied to the inertial moment of the motor and the clutch to be engaged in the relational expression (S41-2); and calculating the value obtained by adding the constant to the clutch torque determined in accordance with the operational profile of the clutch to be engaged, as the maximum motor torque value (S41-3).

In other words, the calculation of the maximum motor torque value may be expressed by the following equation, $$(J_m + J_{CL2})\dot{w}_m = T_m - T_{CL2}$$

$$(J_m + J_{CL2})w_{\dot{m}\_Tgt} = \text{constant}$$

$$T_{m\_max} = T_{CL2} + \text{constant} \quad \text{[Equation 1]}$$

where $J_m$ is inertial moment of a motor, $J_{CL2}$ is inertial moment of a clutch to be engaged in power-on up-shift, $T_m$ is motor torque, $T_{CL2}$ is clutch torque of a clutch to be engaged in power-on up-shift, DOT ($W_m$) is an angular acceleration of a motor, DOT ($W_{m\_Tgt}$) is a target angular acceleration of a motor, and $T_{m\_max}$ is the maximum motor torque value.

Figure 3:
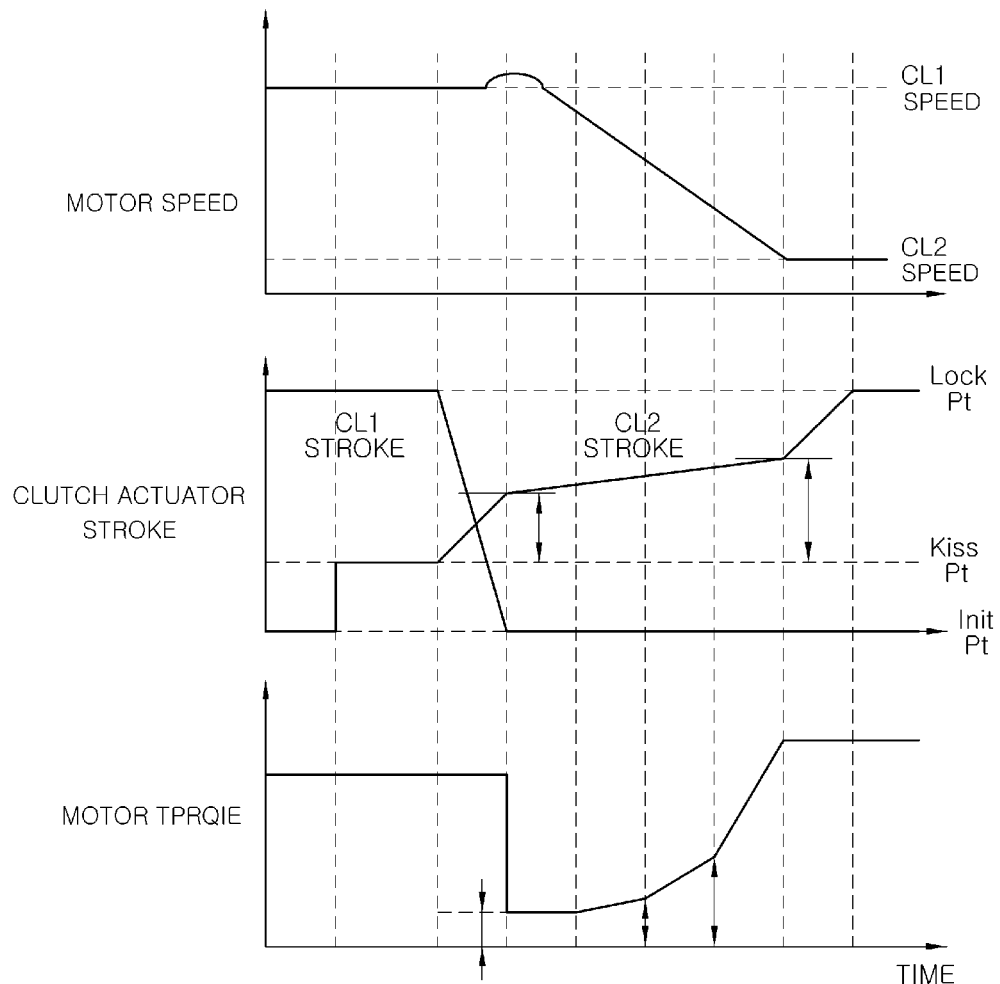
FIG. 3 is an exemplary graph illustrating a process of controlling the electric vehicle of FIG. 1, in power-on up-shift in accordance with the control method of FIG. 2.

In power-on up-shift, as illustrated in FIG. 3, the first clutch CL1 may be disengaged and the second clutch CL2 may be engaged, and the speed of the motor may drop from the same speed as the first clutch CL1 to the same speed as the second clutch CL2. In other words, in the power-on up-shift mode, the motor speed lowers to the speed of the second clutch. Further, the larger the torque of the motor is, the more the synchronization of the motor and the second clutch CL2 may be delayed, thereby delaying shifting. This process may be represented by the relational expression showing that the value obtained by multiplying the inertial moment of a motor and a clutch to be engaged by the angular acceleration of the motor is the same as the value obtained by subtracting the clutch torque of the clutch to be engaged from the motor torque.

In setting the value obtained by the multiplying as a constant (S41-2), the target angular acceleration that may be determined to synchronize the motor speed with the speed of the second clutch CL2 within a target shift time and the sum of the inertial moment of the motor and the second clutch CL2 may be constant.

In calculating the maximum motor torque in step S41-3, the maximum motor torque value may be represented as the sum of the calculated constant and the clutch torque of the second clutch CL2, and the clutch torque of the second clutch CL2 may be transmission torque of a predetermined profile determined in accordance with the stroke of a clutch actuator which is applied to the second clutch CL2, with the clutch torque of the second clutch CL2 calculated as a substantially small value and the target angular acceleration calculated as a substantially large negative value.

However, when the maximum motor torque value determined as described above is determined to be smaller than the target driving torque of the motor at the beginning of shifting, the motor may generate the maximum motor torque value and power-on up-shift may be performed.

In determining a smaller value of the maximum target torque value and the target driving torque of the motor at the beginning of shifting, as motor output torque, the comparison of the target driving torque of the motor at the beginning of shifting is performed to allow for quickly completing shifting rather than controlling the motor torque by using the target driving torque, when the value that has been determined as the target driving torque of the motor at the beginning of shifting is smaller.

The calculating of the minimum motor torque value of a motor to operate in shifting may include: setting a relational expression illustrating a value obtained by multiplying the inertia moment of a motor and a clutch to be engaged by the angular acceleration of the motor may be the same as a value obtained by adding motor torque to clutch torque of the clutch to be engaged, in power-off down-shift (S42-1); setting the value obtained by the multiplying as a constant, with the target angular acceleration (e.g., the target angular acceleration determined in the angular acceleration setting step (S30)) as the angular acceleration of the motor which is multiplied to the inertial moment of the motor and the clutch to be engaged in the relational expression (S42-2); determining the value obtained by subtracting the clutch torque determined in accordance with the operational profile of the clutch to be engaged from the constant, as the minimum motor torque value (S42-3).

In other words, the calculation of the minimum motor torque value may be expressed by the following equation, $$(J_m + J_{CL1})\dot{w}_m = T_m + T_{CL1}$$

$$(J_m + J_{CL1})w_{\dot{m}\_Tgt} = \text{constant}$$

$$T_{m\_min} = -T_{CL1} + \text{constant} \quad \text{[Equation 2]}$$

where $J_m$ is inertial moment of a motor, $J_{CL2}$ is inertial moment of a clutch to be engaged in power-off down-shift, $T_m$ is motor torque, $T_{CL1}$ is clutch torque of a clutch to be engaged in power-off down-shift, DOT ($W_m$) is an angular acceleration of a motor, DOT ($W_{m\_Tgt}$) is a target angular acceleration of a motor, and $T_{m\_min}$ is the minimum motor torque value.

Figure 4:
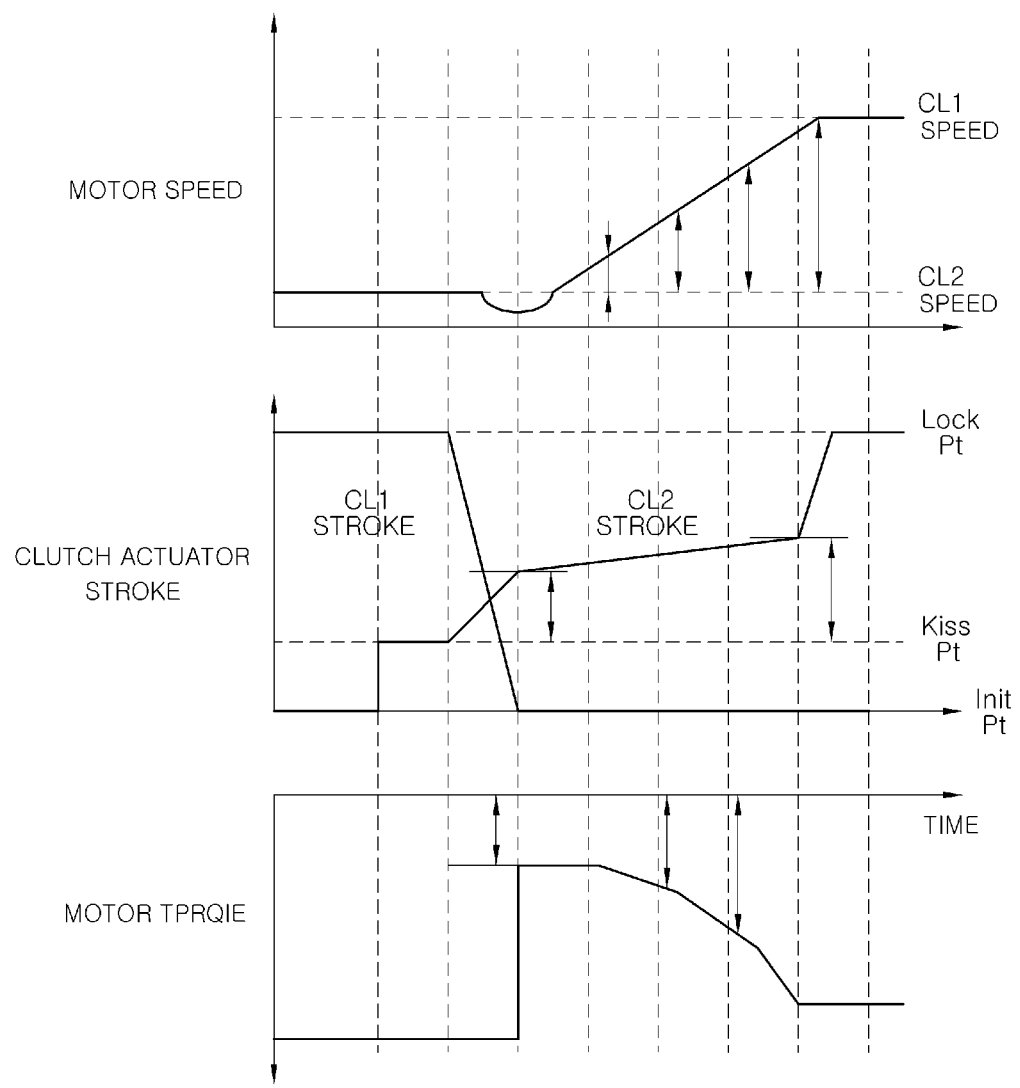
FIG. 4 is an exemplary graph illustrating a process of controlling the electric vehicle of FIG. 1, in power-off down-shift in accordance with the control method of FIG. 2.

In the power-off down-shift described above, unlike the power-on up-shift, as illustrated in FIG. 4, the second clutch CL2 may be disengaged and the first clutch CL1 may be engaged, and the speed of a motor may be synchronized while increasing from the speed of the second clutch CL2 to the speed of the first clutch CL1. In other words, in the power-off down-shift mode, the speed of the motor increases to the speed of the first clutch. Thus, the larger the driving torque of the motor in the negative direction, the more the synchronization of the motor and the first clutch CL1 may be delayed, and shifting delay may be generated. Moreover, the relationship may be represented by the relational expression illustrating that the value obtained by multiplying the inertial moment of a motor and a clutch to be engaged by the angular acceleration of the motor is the same as a value obtained by adding the motor torque to the clutch torque of the clutch to be engaged. Furthermore, the calculation of the minimum motor torque value are performed similarly to the calculation of the maximum motor torque value.

In determining a larger value of the minimum target torque value and target driving torque of the motor at the beginning of shifting, as motor output torque, the minimum motor torque value in the above relation expression may be used to control the motor. Moreover when the value is larger than the target driving torque of the motor at the beginning of shifting and power-off down-shift is performed and when the target driving torque value is larger, shifting may be completed by controlling the motor at the target driving torque, so a faster shifting may be implemented.

As described above, since controlling the motor torque in accordance with the shifting direction may be calculated on the basis of a theoretical base and actively used for control in shifting, it may be possible to improve stability of shifting control and precision, and it may be possible to further improve the quality of shifting by controlling the torque of the motor to be a negative torque.

Although the present invention was described with reference to specific embodiments shown in the drawings, it is apparent to those skilled in the art that the present invention may be changed and modified in various ways without departing from the scope of the present invention, which is described in the following claims.

What is claimed is:

1. A motor torque control method for a vehicle with a transmission comprising:
   determining, by a controller, a power-on up-shift to increase a shifting gear and a power-off down-shift for decreasing the shifting gear in shifting of the vehicle;
   determining, by the controller, a target shift time to complete shifting;
   determining, by the controller, a target angular acceleration of a motor according to the target shift time;
   calculating, by the controller, a maximum motor torque of the motor to operate in shifting, using the target angular acceleration, in response to determining the power-on up-shift;
   determining, by the controller, a smaller value of the calculated maximum target torque and a target driving torque of the motor at the beginning of shifting, as motor output torque to be output by the motor in shifting, in response to determining the power-on up-shift;
   calculating, by the controller, a minimum motor torque of the motor to operate in shifting, using the target angular acceleration, in response to determining the power-off down-shift; and
   determining, by the controller, a larger value of the calculated minimum target torque and the target driving torque of a motor at the beginning of shifting, as motor output torque to be output by the motor in shifting, in response to determining the power-off down-shift,
   wherein calculating the maximum motor torque value calculation, further includes:
      setting, by the controller, a relational expression of a value obtained by multiplying the inertia moment of the motor and a clutch to be engaged by the angular acceleration of the motor is the same as a value obtained by subtracting the clutch torque of the clutch to be engaged from the motor torque, in power-on up-shift;
      setting, by the controller, the value obtained by the multiplying as a constant, with the target angular acceleration as the angular acceleration of the motor which is multiplied to the inertial moment of the motor and the clutch to be engaged in the relational expression; and
      determining, by the controller, the value obtained by adding the constant to the clutch torque determined in accordance with the operational profile of the clutch to be engaged, as the maximum torque motor value.

2. The method of claim 1, the relation expression is expressed by the following formula, $$(J_m + J_{CL2})\dot{w}_m = T_m - T_{CL2}$$

$$(J_m + J_{CL2})w_{\dot{m}\_Tgt} = \text{constant}$$

$$T_{m\_max} = T_{CL2} + \text{constant}$$

wherein $J_m$ is inertial moment of a motor, $J_{CL2}$ is inertial moment of a clutch to be engaged in power-on up-shift, $T_m$ is motor torque, $T_{CL2}$ is clutch torque of a clutch to be engaged in power-on up-shift, DOT ($W_m$) is an angular acceleration of a motor, DOT ($W_{m\_Tgt}$) is a target angular acceleration of a motor, and $T_{m\_max}$ is the maximum motor torque value.

3. The method of claim 1, wherein calculating the minimum motor torque value further includes:

setting, by the controller, a relational expression of a value obtained by multiplying the inertia moment of the motor and a clutch to be engaged by the angular acceleration of the motor is the same as a value obtained by adding motor torque to clutch torque of the clutch to be engaged, in power-off down-shift;

setting, by the controller, the value obtained by the multiplying as a constant, with the target angular acceleration as the angular acceleration of the motor which is multiplied to the inertial moment of the motor and the clutch to be engaged in the relational expression; and determining, by the controller, the value obtained by subtracting the clutch torque determined in accordance with the operational profile of the clutch to be engaged from the constant, as the minimum motor torque value that is the minimum motor torque.

4. The method of claim 1, wherein the relational expression is expressed by the following equation, $$(J_m+J_{CL1})\dot{w}_m=T_m-T_{CL1}$$

$$(J_m+J_{CL1})w_{\dot{m}\_Tgt}=\text{constant}$$

$$T_{m\_min}=-T_{CL1}+\text{constant}$$

wherein $J_m$ is inertial moment of a motor, $J_{CL2}$ is inertial moment of a clutch to be engaged in power-off down-shift, $T_m$ is motor torque, $T_{CL1}$ is clutch torque of a clutch to be engaged in power-off down-shift, DOT ($W_m$) is an angular acceleration of a motor, DOT ($W_{m\_Tgt}$) is a target angular acceleration of a motor, and $T_{m\_min}$ is the minimum motor torque value.

5. A motor torque control system for a vehicle with a transmission comprising:

a controller configured to:
determine a power-on up-shift to increase a shifting gear and a power-off down-shift for decreasing the shifting gear in shifting of the vehicle;

determine a target shift time to complete shifting;

determine a target angular acceleration of a motor according to the target shift time;

calculate a maximum motor torque of the motor to operate in shifting, using the target angular acceleration, in response to determining the power-on up-shift;

determine a smaller value of the calculated maximum target torque and a target driving torque of the motor at the beginning of shifting, as motor output torque to be output by the motor in shifting, in response to determining the power-on up-shift;

calculate a minimum motor torque of the motor to operate in shifting, using the target angular acceleration, in response to determining the power-off down-shift; and determine a larger value of the calculated minimum target torque and the target driving torque of a motor at the beginning of shifting, as motor output torque to be output by the motor in shifting, in response to determining the power-off down-shift, wherein in calculating the maximum motor torque value, the controller is further configured to:

set a relational expression of a value obtained by multiplying the inertia moment of the motor and a clutch to be engaged by the angular acceleration of the motor is the same as a value obtained by subtracting the clutch torque of the clutch to be engaged from the motor torque, in power-on up-shift;

set the value obtained by the multiplying as a constant, with the target angular acceleration as the angular acceleration of the motor which is multiplied to the inertial moment of the motor and the clutch to be engaged in the relational expression; and determine the value obtained by adding the constant to the clutch torque determined in accordance with the operational profile of the clutch to be engaged, as the maximum torque motor value.

6. The system of claim 5, wherein the relation expression is expressed by the following formula, $$(J_m+J_{CL2})\dot{w}_m=T_m-T_{CL2}$$

$$(J_m+J_{CL2})w_{\dot{m}\_Tgt}=\text{constant}$$

$$T_{m\_max}=T_{CL2}+\text{constant}$$

wherein $J_m$ is inertial moment of a motor, $J_{CL2}$ is inertial moment of a clutch to be engaged in power-on up-shift, $T_m$ is motor torque, $T_{CL2}$ is clutch torque of a clutch to be engaged in power-on up-shift, DOT ($W_m$) is an angular acceleration of a motor, DOT ($W_{m\_Tgt}$) is a target angular acceleration of a motor, and $T_{m\_max}$ is the maximum motor torque value.

7. The system of claim 5, wherein the controller is further configured to:

set a relational expression of a value obtained by multiplying the inertia moment of the motor and a clutch to be engaged by the angular acceleration of the motor is the same as a value obtained by adding motor torque to clutch torque of the clutch to be engaged, in power-off down-shift;

set the value obtained by the multiplying as a constant, with the target angular acceleration as the angular acceleration of the motor which is multiplied to the inertial moment of the motor and the clutch to be engaged in the relational expression; and determine the value obtained by subtracting the clutch torque determined in accordance with the operational profile of the clutch to be engaged from the constant, as the minimum motor torque value that is the minimum motor torque.

8. The system of claim 7, wherein the relational expression is expressed by the following equation, $$(J_m+J_{CL1})\dot{w}_m=T_m-T_{CL1}$$

$$(J_m+J_{CL1})w_{\dot{m}\_Tgt}=\text{constant}$$

$$T_{m\_min}=-T_{CL1}+\text{constant}$$

wherein $J_m$ is inertial moment of a motor, $J_{CL2}$ is inertial moment of a clutch to be engaged in power-off down-shift, $T_m$ is motor torque, $T_{CL1}$ is clutch torque of a clutch to be engaged in power-off down-shift, DOT ($W_m$) is an angular acceleration of a motor, DOT ($W_{m\_Tgt}$) is a target angular acceleration of a motor, and $T_{m\_min}$ is the minimum motor torque value.

9. A non-transitory computer readable medium containing program instructions executed by a controller, the computer readable medium comprising:

program instructions that determine a power-on up-shift to increase a shifting gear and a power-off down-shift for decreasing the shifting gear in shifting of a vehicle;

program instructions that determine a target shift time to complete shifting;

program instructions that determine a target angular acceleration of a motor according to the target shift time;

program instructions that calculate a maximum motor torque of the motor to operate in shifting, using the target angular acceleration, in response to determining the power-on up-shift;

program instructions that determine a smaller value of the calculated maximum target torque and a target driving torque of the motor at the beginning of shifting, as motor output torque to be output by the motor in shifting, in response to determining the power-on up-shift;

program instructions that calculate a minimum motor torque of the motor to operate in shifting, using the target angular acceleration, in response to determining the power-off down-shift;

program instructions that determine a larger value of the calculated minimum target torque and the target driving torque of a motor at the beginning of shifting, as motor output torque to be output by the motor in shifting, in response to determining the power-off down-shift; and program instructions that set a relational expression of a value obtained by multiplying the inertia moment of the motor and a clutch to be engaged by the angular acceleration of the motor is the same as a value obtained by subtracting the clutch torque of the clutch to be engaged from the motor torque, in power-on up-shift;

program instructions that set the value obtained by the multiplying as a constant, with the target angular acceleration as the angular acceleration of the motor which is multiplied to the inertial moment of the motor and the clutch to be engaged in the relational expression; and program instructions that determine the value obtained by adding the constant to the clutch torque determined in accordance with the operational profile of the clutch to be engaged, as the maximum torque motor value.

10. The non-transitory computer readable medium of claim 9, wherein the relation expression is expressed by the following formula, $$(J_m + J_{CL2})\dot{w}_m = T_m - T_{CL2}$$

$$(J_m + J_{CL2})w_{m\_Tgt} = \text{constant}$$

$$T_{m\_max} = T_{CL2} + \text{constant}$$

wherein $J_m$ is inertial moment of a motor, $J_{CL2}$ is inertial moment of a clutch to be engaged in power-on up-shift, $T_m$ is motor torque, $T_{CL2}$ is clutch torque of a clutch to be engaged in power-on up-shift, DOT ($W_m$) is an angular acceleration of a motor, DOT ($W_{m\_Tgt}$) is a target angular acceleration of a motor, and $T_{m\_max}$ is the maximum motor torque value.

11. The non-transitory computer readable medium of claim 9, further comprising:

program instructions that set a relational expression of a value obtained by multiplying the inertia moment of the motor and a clutch to be engaged by the angular acceleration of the motor is the same as a value obtained by adding motor torque to clutch torque of the clutch to be engaged, in power-off down-shift;

program instructions that set the value obtained by the multiplying as a constant, with the target angular acceleration as the angular acceleration of the motor which is multiplied to the inertial moment of the motor and the clutch to be engaged in the relational expression; and program instructions that determine the value obtained by subtracting the clutch torque determined in accordance with the operational profile of the clutch to be engaged from the constant, as the minimum motor torque value that is the minimum motor torque.

12. The non-transitory computer readable medium of claim 11, wherein the relational expression is expressed by the following equation, $$(J_m + J_{CL1})\dot{w}_m = T_m - T_{CL1}$$

$$(J_m + J_{CL1})w_{m\_Tgt} = \text{constant}$$

$$T_{m\_min} = -T_{CL1} + \text{constant}$$

wherein $J_m$ is inertial moment of a motor, $J_{CL2}$ is inertial moment of a clutch to be engaged in power-off down-shift, $T_m$ is motor torque, $T_{CL1}$ is clutch torque of a clutch to be engaged in power-off down-shift, DOT ($W_m$) is an angular acceleration of a motor, DOT ($W_{m\_Tgt}$) is a target angular acceleration of a motor, and $T_{m\_min}$ is the minimum motor torque value.

* * * * *